(12) United States Patent
Hurewitz et al.

(10) Patent No.: US 8,453,070 B2
(45) Date of Patent: May 28, 2013

(54) INTERACTIVE USER INTERFACE FOR DISPLAYING SUPPLY CHAIN INFORMATION

(75) Inventors: Barry Scott Hurewitz, New York, NY (US); Vaughn Stephen Harvey, New York, NY (US)

(73) Assignee: Morgan Stanley, New York, NY (US)

( * ) Notice: Subject to any disclaimer, the term of this patent is extended or adjusted under 35 U.S.C. 154(b) by 943 days.

(21) Appl. No.: 12/079,181

(22) Filed: Mar. 25, 2008

(65) Prior Publication Data

US 2008/0178071 A1  Jul. 24, 2008

Related U.S. Application Data

(63) Continuation of application No. 10/809,776, filed on Mar. 25, 2004, now Pat. No. 7,376,912.

(51) Int. Cl.
*G06F 3/048* (2006.01)
*G06Q 40/00* (2012.01)

(52) U.S. Cl.
USPC ........... 715/804; 715/783; 715/841; 715/968; 705/35

(58) Field of Classification Search
USPC .............................. 715/804, 841, 835; 705/35
See application file for complete search history.

(56) References Cited

U.S. PATENT DOCUMENTS

| | | |
|---|---|---|
| 5,295,242 A | 3/1994 | Mashruwala et al. |
| 5,408,655 A | 4/1995 | Oren et al. |
| 5,493,658 A | 2/1996 | Chiang et al. |
| 5,539,872 A | 7/1996 | Mintz et al. |
| 5,546,529 A | 8/1996 | Bowers et al. |
| 5,594,899 A | 1/1997 | Knudsen et al. |
| 5,708,787 A | 1/1998 | Nakano et al. |
| 5,786,818 A | 7/1998 | Brewer et al. |
| 5,801,702 A | 9/1998 | Dolan et al. |
| 5,920,315 A | 7/1999 | Santos-Gomez |

(Continued)

FOREIGN PATENT DOCUMENTS

| EP | 1265157 A2 | 12/2002 |
|---|---|---|
| JP | H5/342215 | 12/1993 |

(Continued)

OTHER PUBLICATIONS

Office Action issued in U.S. Appl. No. 10/809,776 dated Mar. 30, 2007.

(Continued)

*Primary Examiner* — Nicholas Ulrich
(74) *Attorney, Agent, or Firm* — K&L Gates LLP

(57) ABSTRACT

An interactive user interface is disclosed. According to various embodiments, the interface includes a first field and at least one additional field. The first field lists a focal item and the at least one additional field contains a listing of items related to the focal item. Certain of the related items in the at least one additional field include a hyperlink which, when activated by the user, causes the item corresponding to the activated hyperlink to become a new focal item listed in the first field, such that the at least one additional field transitions to list items related to the new focal item. The focal item may be, for example, an identifier corresponding to a company, and the at least one additional field may contain a listing of identifiers corresponding to companies that are customers, suppliers or competitors of the focal item company.

17 Claims, 5 Drawing Sheets

U.S. PATENT DOCUMENTS

| | | | |
|---|---|---|---|
| 5,930,787 A * | 7/1999 | Minakuchi et al. ............... 1/1 |
| 5,940,820 A | 8/1999 | Kagiwada |
| 6,177,936 B1 | 1/2001 | Cragun |
| 6,334,131 B2 | 12/2001 | Chakrabarti et al. |
| 6,338,067 B1 | 1/2002 | Baker et al. |
| 6,363,353 B1 | 3/2002 | Chen |
| 6,577,304 B1 | 6/2003 | Yablonski et al. |
| 6,631,363 B1 | 10/2003 | Brown et al. |
| 6,633,910 B1 | 10/2003 | Rajan et al. |
| 6,711,589 B2 | 3/2004 | Dietz |
| 7,007,029 B1 | 2/2006 | Chen |
| 7,017,121 B1 | 3/2006 | Gikas et al. |
| 7,149,698 B2 | 12/2006 | Guheen et al. |
| 7,188,317 B1 | 3/2007 | Hazel |
| 7,376,912 B2 | 5/2008 | Hurewitz et al. |
| 7,590,940 B2 | 9/2009 | Hurewitz et al. |
| 7,761,797 B2 | 7/2010 | Hurewitz et al. |
| 7,774,709 B2 | 8/2010 | Hurewitz et al. |
| 2002/0073108 A1 | 6/2002 | Morita et al. |
| 2002/0099598 A1 | 7/2002 | Eicher et al. |
| 2003/0004929 A1 | 1/2003 | Julian et al. |
| 2003/0046095 A1 * | 3/2003 | Jessop et al. ............... 705/1 |
| 2003/0046214 A1 | 3/2003 | Menninger |
| 2003/0117443 A1 | 6/2003 | Langner et al. |
| 2003/0160829 A1 | 8/2003 | Miksovsky et al. |
| 2004/0068431 A1 | 4/2004 | Smith et al. |
| 2005/0021425 A1 | 1/2005 | Casey |
| 2005/0108024 A1 | 5/2005 | Fawcett, Jr. et al. |
| 2005/0108262 A1 | 5/2005 | Fawcett, Jr. et al. |
| 2005/0114774 A1 | 5/2005 | Berryman |
| 2005/0210406 A1 | 9/2005 | Biwer et al. |
| 2005/0216861 A1 | 9/2005 | Hurewitz et al. |
| 2005/0265083 A1 | 12/2005 | Perry |
| 2006/0178918 A1 | 8/2006 | Mikurak |
| 2008/0109726 A1 | 5/2008 | Hurewitz et al. |

FOREIGN PATENT DOCUMENTS

| | | |
|---|---|---|
| JP | H8/278978 A | 10/1996 |
| JP | 2000/3389 A | 1/2000 |
| JP | 2000/231567 A | 8/2000 |
| JP | 2002/24648 A | 1/2002 |
| JP | 2002/116933 A | 4/2002 |
| JP | 2002/531900 A | 9/2002 |
| JP | 2003/16282 A | 1/2003 |
| JP | 2003/99546 A | 4/2003 |
| JP | 2003/288467 A | 10/2003 |
| JP | 2003-288469 | 10/2003 |
| JP | 2003/323534 A | 11/2003 |
| JP | 2003-345971 | 12/2003 |
| JP | 2004/54662 A | 2/2004 |
| WO | WO 00/33238 A2 | 6/2000 |
| WO | WO 02/42880 A2 | 5/2002 |

OTHER PUBLICATIONS

Office Action issued in U.S. Appl. No. 10/809,776 dated Oct. 17, 2007.

Notice of Allowability issued in U.S. Appl. No. 10/809,776 dated Feb. 7, 2008.

Notice of Allowability issued in U.S. Appl. No. 11/247,505 dated May 11, 2009.

Non-Final Rejection issued in U.S. Appl. No. 12/539,221 dated Apr. 13, 2010.

Notice of Allowability issued in U.S. Appl. No. 12/539,221 dated Jun. 11, 2010.

Notice of Allowability issued in U.S. Appl. No. 12/539,230 dated Mar. 8, 2010.

* cited by examiner

INTERACTIVE USER INTERFACE FOR DISPLAYING SUPPLY CHAIN INFORMATION

The present application is a continuation of U.S. patent application Ser. No. 10/809,776 filed on Mar. 25, 2004 now U.S. Pat. No. 7,376,912, which is incorporated herein by reference.

BACKGROUND OF INVENTION

The present invention is directed generally to systems and methods for presenting supply chain information interactively.

In the financial services industry, the value of information decays rapidly. As a result, value for an investor can be created by compressing the response time by the investor (or a manager of the investor's assets) to important news. For example, if a company announces plans to enter bankruptcy protection, it may be valuable to an investor to quickly consider its positions on suppliers, creditors, customers and/or competitors of the bankrupt company in response to the news—before others can act on it. Determining the suppliers, creditors, customers and competitors of a company, however, in a rapid fashion—rapid enough to maximize or increase value to the investor—is not always possible. In the past, investors have relied on institutional knowledge of these interdependencies and relationships, or have relied on paper charts of the information. Such mechanisms are often inaccurate, outdated, cumbersome, static and/or incomplete. Therefore, there exists a need for a manner in which an investor can quickly and interactively navigate through an industry's supply chain to see key interdependencies and relationships between the spectrum of participants.

SUMMARY OF THE INVENTION

In one general aspect, various embodiments of the present invention are directed to an interactive user interface. The interface may include a first field and at least one additional field. The first field lists a focal item and the at least one additional field contains a listing of items related to the focal item. Certain of the related items in the at least one additional field include a hyperlink which, when activated by the user, causes the item corresponding to the activated hyperlink to become a new focal item listed in the first field, such that the at least one additional field transitions to list items related to the new focal item.

According to various implementations, the focal item may be an identifier corresponding to a company and the at least one additional field may contain a listing of identifiers corresponding to companies that are customers, suppliers or competitors of the focal item company. In this way, the user may interactively navigate through the supply chain for a company to ascertain, for example, key interdependencies that may be valuable in providing timely investing advice. For example, the user could navigate three or more derivatives up, down, or across the supply chain very quickly and discern the impact of market moves on players several orders down or upstream. In other variations, the focal item may be an economic indicator and the at least one additional field may list companies whose stock prices are known to be heavily affected by changes in the particular economic indicator.

In another general aspect, various embodiments of the present invention are directed to a system for providing the interactive user interface to the user. The system comprises a database for storing data about the items (e.g., companies) and a server in communication with the database. The server may serve a document containing the interactive user interface via a network to the user. The interactive user interface may include, as before, a first field and at least one additional field. The first field lists a focal item and the at least one additional field contains a listing of items related to the focal item. Certain of the related items in the at least one additional field include a hyperlink which, when activated by the user, causes the item corresponding to the activated hyperlink to become a new focal item listed in the first field, such that the at least one additional field transitions to list items related to the new focal item.

In yet another general aspect, various embodiments of the present invention are directed to a method of presenting or displaying data in an interactive user interface to a user. The method may include displaying a first page. The first page may include the interactive user interface, including a focal item in a first field and a listing of items related to the focal item in the at least one additional field, wherein certain of the related items include a hyperlink. In addition, the method may include displaying a second page when the user activates one of the hyperlinks of the first page. The second page may include a revised version of the interface, wherein the item corresponding to the activated hyperlink in the first page is the new focal item. The second page may further include, as before, a listing of new items related to the new focal item in the at least one additional field, wherein certain of the new related items in the second page include a hyperlink. In an extension of this technique, the user could continually and quickly jump to new pages, each with a new focal item, to thereby quickly move through a variety of pages and learn the interdependencies and business relationships for each of the various focal items.

DESCRIPTION OF THE FIGURES

Embodiments of the present invention are described below by way of example in conjunction with the following figures, wherein.

DESCRIPTION OF THE INVENTION

Figure 1:
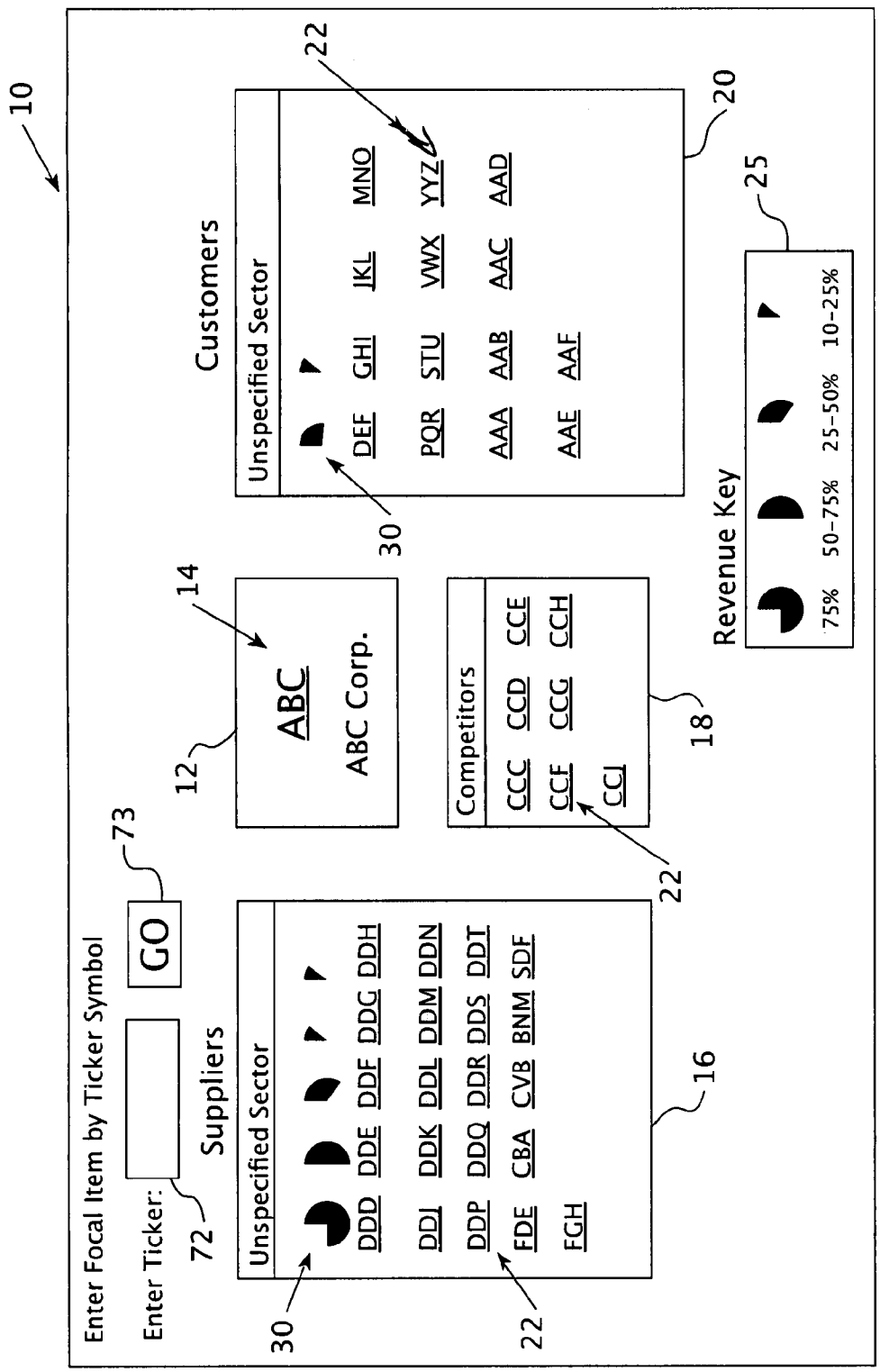
FIGS. 1-3 and 5 are diagrams of an interactive user interface according to various embodiments of the present invention.

FIG. 1 is a diagram of an interactive user interface 10 according to various embodiments of the present invention. The user may be presented with the interface 10, as described further below in connection with FIG. 4, using a computing device (not shown) having a monitor and web browsing software to display the interface 10 based on pages from a server.

As can be seen in the illustrated embodiment of FIG. 1, the interface 10 includes a field 12 positioned toward the center of the interface 10 and which is populated with an item 14. The item 14 may be, for example, an identification of a business entity, such as the stock trading symbol for the business. The user may enter the information for the item 14 or may select it in response to a search query. According to other variations, the item 14 may be, for example, a parameter, such as an economic indicator, including CPI, GNP, etc.

The interface also includes additional fields 16, 18, 20. These additional fields 16, 18, 20 may list items 22 that are related to the item 14 in the field 12. The items 22 may also be an identification of a business entity, such as the stock trading symbol for the business. Because the items 22 listed in the fields 16, 18, 20 are related to the item 14 in the field, the item 14 is sometimes referred to hereinafter as the "focal item."

For an interface 10 where the focal item 14 identifies a business entity, the additional fields 16, 18, 20 may list, for example, suppliers, competitors and customers, respectively, of the focal item 14. According to other embodiments, the interface 10 may include more or fewer fields listing items related to the focal item. Additional fields that may be used, for example, are fields that list creditors, debtors, joint venture partners, etc. of the focal item 14.

Different parameters may be used to determine the items 22 listed in the additional fields 16, 18, 20. For example, according to one embodiment, suppliers and customers of the focal item 14 may be determined based on revenue. That is, for example, each of the items 22 listed in supplier's field 16 may indicate companies that derive a threshold amount (such as 5%) of their revenue through sales to the focal item 14. Similarly, the focal item 14 may derive a threshold amount (such as 5%) of its revenues through sales to companies indicated by the items 22 listed in the customer's field 20. The competitor's field 18 may list items 22 that are indicative of companies that compete with the focal item 14 in the marketplace. Although FIG. 1 uses the parameter of revenue to determine the items to be listed in the supplier's and customer's fields 16, 20, other variations of the interface 10 may be different parameters such as, for example, price-to-earnings ratio, inventory level, debt-to-equity ratio, etc.

Certain of the items 22 (that is, all of the items 22 or less than all of the items 22) in the additional fields 16, 18, 20 may further have associated indicia of the quantity of the parameter defining the relationships. For example, where the parameter is revenue, as shown in the example of FIG. 1, certain of the items 22 in the supplier's field 16 may have associated indicia 30 indicative of how much revenue the items 22 derive from sales to the focal item 14. The indicia 30 may be, for example, a number, a graphical representation and/or a color-coded representation. In FIG. 1, graphical representations, specifically pie slices, are used as the indicia 30. For example, the interface 10 may include a key 25 showing the meaning of, for example, the graphical and/or color-coded representations. With reference to the key 25 in FIG. 1, company DDD may receive greater than 75% of its revenue from ABC Corp. (the focal item 14), company DDE may receive 50-75% of its revenue from ABC Corp., company DDF may receive 25-50% of its revenue from ABC Corp., and companies DDG and DDH may receive 10-25% of their revenue from ABC Corp. The companies indicated by the other items 22 in field 16 (such as DDJ, DDK, etc.) may receive less than 10% of their revenue from ABC in this example. According to various embodiments, the pie slices may be of different colors to provide a more perspicuous indication of the relationship. As is shown in FIG. 1, the group of companies DDD, DDE, DDF, DDG and DDH are displayed within the supplier field 16 from left to right in order from the company receiving the highest amount of its revenue from ABC Corp. (i.e., DDD) to the companies receiving the lowest amount of their revenue from ABC Corp. (i.e., DDG, DDH).

Certain of the items 22 may contain hyperlinks that, when activated by the user, generate a new display with the item 22 corresponding to the activated hyperlink in the field 12 as the new focal item 14. The additional fields 16, 18, 20 would then be populated with items appropriately related to the new focal item 14. For example, with reference to FIG. 1, if the user activated the hyperlink for supplier "SDF," a new display would be generated with "SDF" in the field 12 as the new focal item 14, with the fields 16, 18, 20 listing suppliers, competitors and customers of the company corresponding to the symbol "SDF," respectively, as shown in FIG. 2.

Figure 3:
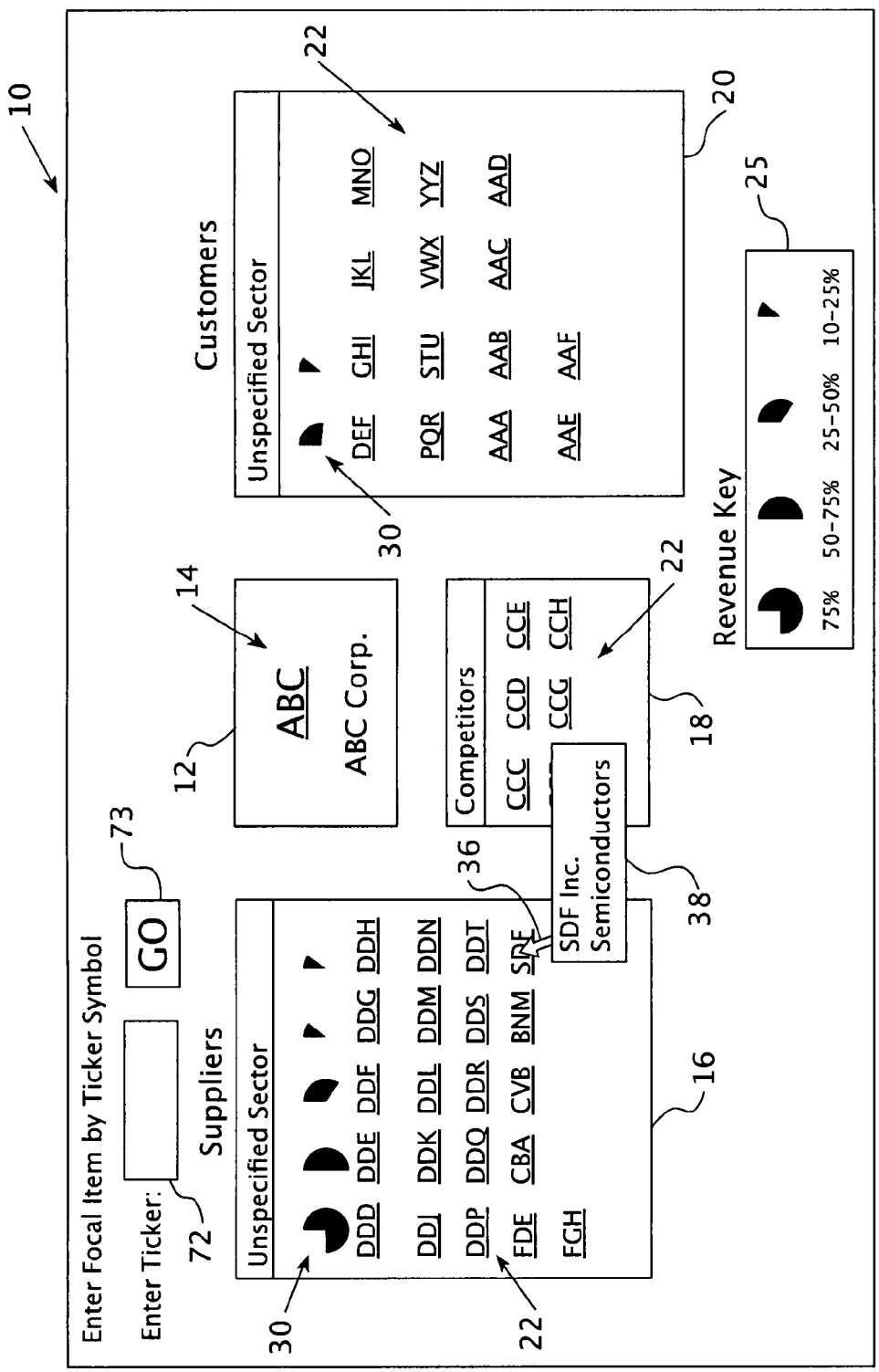

In addition, certain of the items 22 may have an associated mouseover, such that when the user passes the cursor 36 near the item 22 on the display 10, a display window 38 containing additional information about the company indicated by the item 22 is displayed to the user, such as shown in FIG. 3. The additional information may include, for example, the full name of the company, its industry sector(s), its market capitalization, etc.

Figure 2:
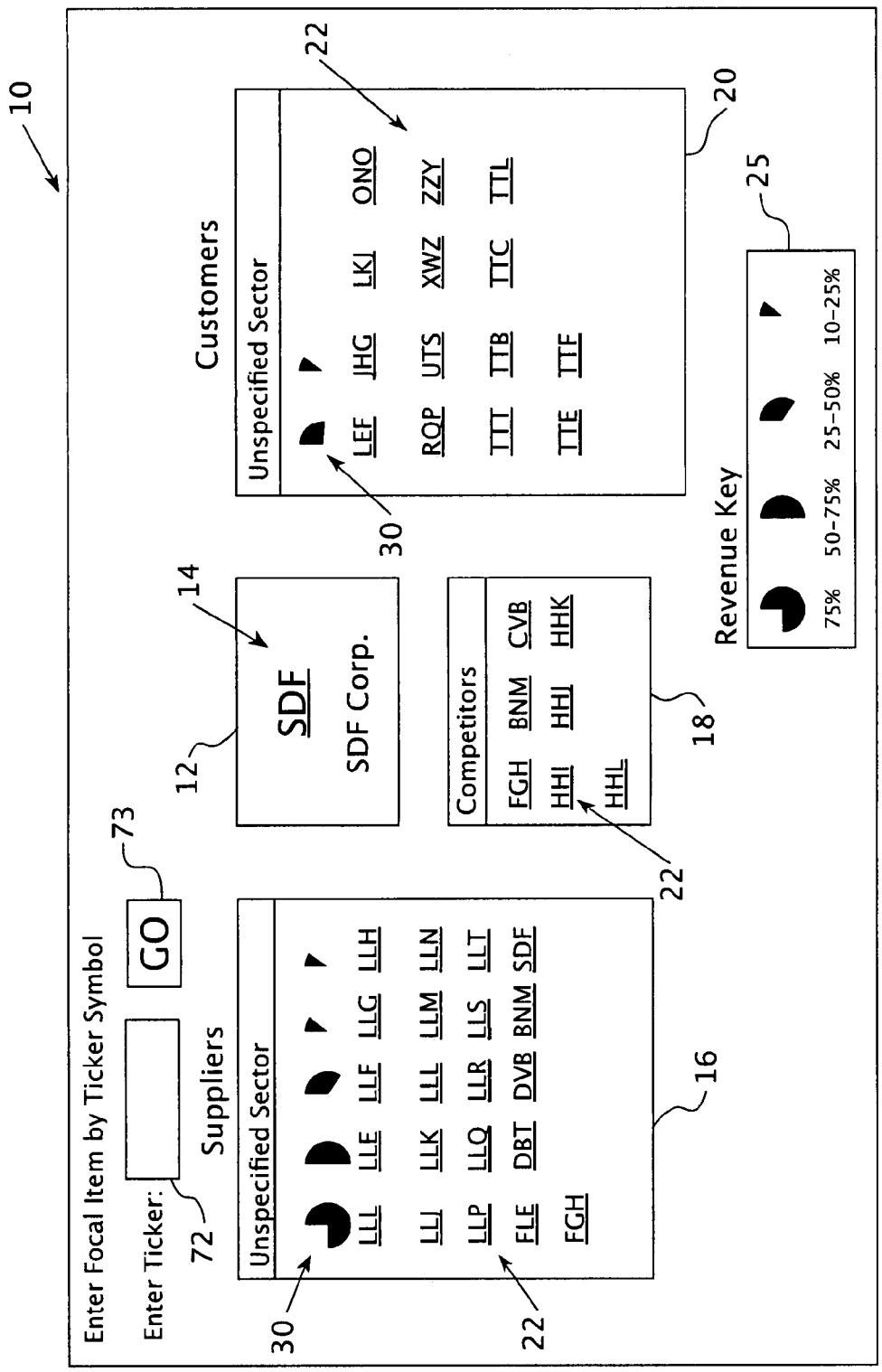

Also, as illustrated in FIGS. 1-3, the user interface 10 may include a focal item input field 72 where the user could type in an identifier for new focal item. For example, according to one embodiment, the identifier could be the stock trading symbol for a company or an abbreviation for an economic indicator (such as GNP, etc.). In this way, rather than activating one of the hyperlinks for one of the items 22 in one of the fields 16, 18 or 20 to be the new focal item, the user could instead type in the symbol for the new focal item in the field 72. When the user clicks on the activation button 73 or hits the "Enter" key on its keyboard, a new page would be displayed for the user with the new focal item 14 in the field 12 and with, for example, the suppliers, competitors and customers of the new focal item 14 listed in the fields 16, 18, 20 respectively.

As mentioned previously, the focal item 14 may be an economic parameter, such as GNP, CPI, etc. When the focal item 14 is such an economic parameter, one of the additional fields 16, 18, 20 may list items 22 representing companies that are heavily affected by that particular economic parameter. For example, the additional field may include a list of companies whose stock price is known to change in response to changes in the particular economic indicator.

In this way, users may interactively, quickly and perspicuously navigate through a company's supply chain and see key interdependencies and relationships between the spectrum of participants. For example, the user could navigate through three or more derivatives up, down or across a supply chain quickly to discern the impact of market moves on players several orders down or upstream. With reference to the example of FIG. 1, the user may quickly discern that company DDD (in field 16) derives a significant portion of its revenues from ABC Corp. (the focal item 14). Thus, for example, if ABC Corp. happened to announce that it was entering bankruptcy, the user would know immediately that the continued revenue stream of company DDD may be impaired. This is but one example of the type of information, critically important to investors, that could be discerned using an interactive user interface as described herein.

Figure 4:
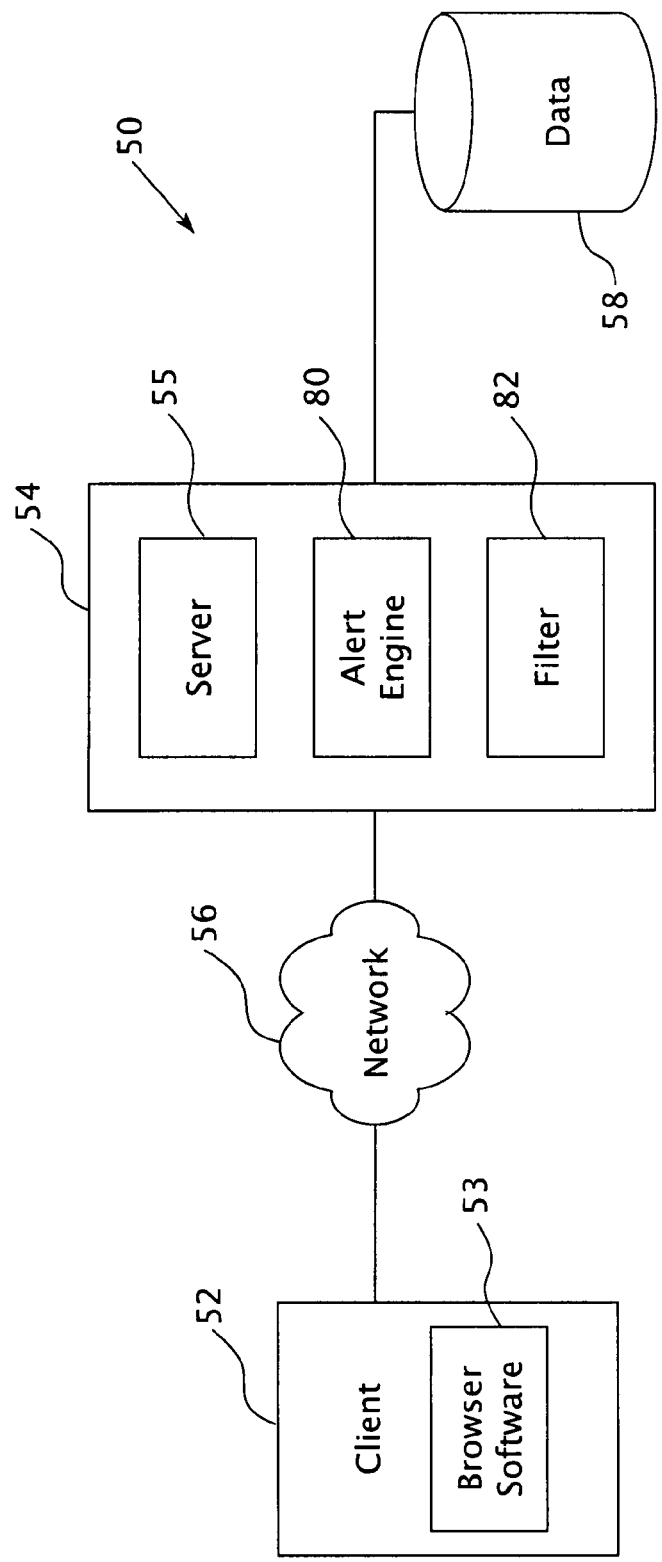
FIG. 4 is a diagram of a system according to various embodiments of the present invention.

The interactive user interface 10 may be implemented, in various embodiments, in a web environment. FIG. 4 is a diagram of such a system 50 according to various embodiments. The user may view the interface 10 at a client device 52, which may include web browser software 53 for displaying web pages. The client device 52 may be any type of device capable of receiving, rendering and displaying web pages such as, for example, a portable computer (PC), a laptop computer, a workstation, a web-enabled telephone, etc. The interactive user interface 10 may be part of a web page served to the client device 52 from a host computing device 54 (referred to hereinafter as the "host") through a network 56. The host 54, which is shown as a single device in FIG. 4 but which may be embodied as a series of networked computing devices, may include a server 55 for generating the web pages of the interface 10 based on data stored in a database 58. The server 55 may serve the generated web pages via the network 56 to the client device 52.

According to various embodiments, the database 58 may include model data that is tagged and extracted from numerous analysts' models of companies, but publicly traded and privately held. This data may be processed to gather the customer-supplier relationships, etc. to be shown on the interactive interface 10. The database 58 may utilize XBRL (Extensible Business Reporting Language) data. The data may also be validated. In addition, data from other sources may be included in the database 58. Such additional sources include SEC data (e.g., Edgar Online data) and data from subscription data services. The data from these additional data sources may also be validated.

Figure 5:
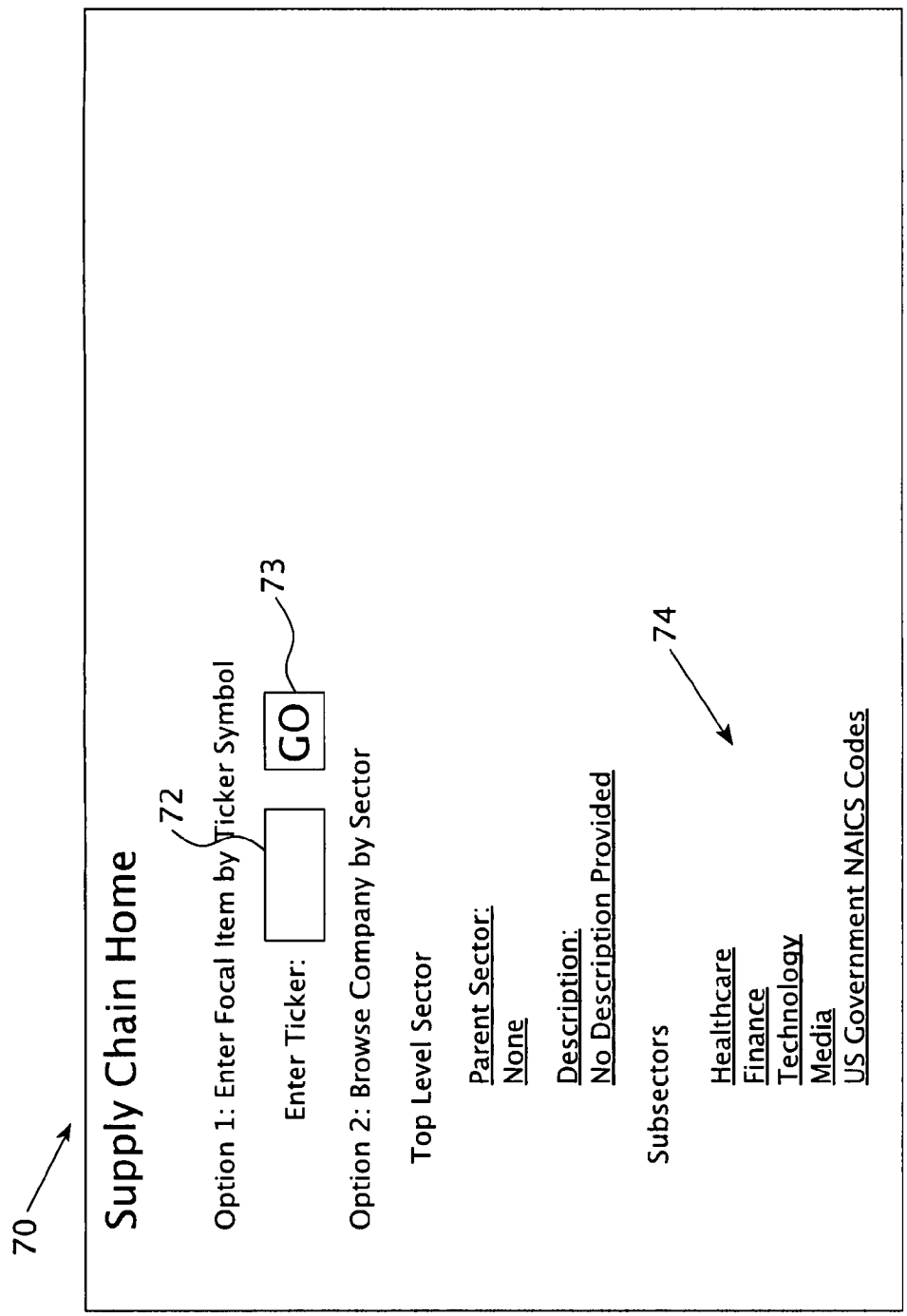

As mentioned previously, the user may enter the focal item 14 (see FIG. 1), or it may select the focal item in response to a search query or a drill down through a hierarchy of industry sector-related folders. FIG. 5 illustrates an example of an interactive user interface 70 through which a user may enter the focal item 14 (see FIG. 1) according to various embodiments of the present invention. For the example illustrated in FIG. 5, the user may type in the ticker symbol or economic indicator abbreviation for the focal item 14 in the focal item input field 72. Alternatively, the user may drill down through sector folders 74 to enter the focal item 14. Once the focal item is selected, an interactive user interface as shown in FIG. 1 may be displayed for the user.

Referring back to FIG. 4, the host 54 may also include an alert engine 80 and a filter 82. The alert engine 80 and filter 82 may be implemented as software code to be executed by a processor(s) (not shown) of the host 54 using any type of computer instruction type suitable, such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard drive or a floppy disk, or an optical medium such as a CD-ROM.

The alert engine 80 may receive alerts generated by applications (not shown). The alerts may be messages indicating that some type of predetermined event has occurred. The user, via the client device 52, may set criteria that establish the type of alerts to be generated. For example, the user may set criteria such that if the stock price for a particular company changes by more than 5% during one trading day, an alert is generated. The alert engine 80 may receive the generated alerts and route them to the appropriate users. The alerts may be, for example, messages sent via the network 56 to the user's client device 52.

The filter 82 may filter data from the database 58 to be displayed on the interactive display 10. For example, with reference to FIG. 1, field 16 contains a listing of companies that receive revenue through sales to the focal company (focal item 14). Instead of listing every company in the database 58 that is known to receive revenue from the focal company, the filter 82 may filter out all companies that receive less than a threshold percentage (such as 1%, 2%, 5%, etc.) of their revenue from the focal company. Similarly, the filter 82 may filter out companies for the customer field 20 from which the focal company receives less than a threshold percentage of its revenue. According to various embodiments, the user may select the threshold percentage or an administrator of the host 54 may set the threshold values.

Various embodiments of the present invention are also directed to a method of presenting data in an interactive user interface to a user. The method may include displaying a first page with the interactive user interface 10, such as shown in FIG. 1, to the user. The page may be served as part of a document served to the user's client device 52 by the server 55 of the host 54 (see FIG. 4). The method may also include displaying a second page to the user when one of the hyperlinks contained in any of the fields 16, 18, 20 is activated by the user. In the second page, the item corresponding to the activated hyperlink may be the new focal item 14 in the field 12, as shown in FIG. 2. As such, the fields 16, 18, 20 may list items related to the new focal item 14. Further, the items in fields 16, 18, 20 in the second page may also have associated hyperlinks and mouseovers, just like the first page. The user may interactively navigate through the supply chain by continually repeating this process, selecting different items (e.g., companies or economic indicators) to be the new focal item.

While several embodiments of the present invention have been described herein, it should be apparent that various modifications, alterations and adaptations to those embodiments may occur to persons skilled in the art. It is therefore intended to cover all such modifications, alterations and adaptations without departing from the scope and spirit of the present invention as defined by the appended claims.

What is claimed is:

1. A computerized method of presenting related company data via an interactive user interface, comprising:
   receiving, via the user interface of an electronic computing device, a user selection of a focal item, wherein the focal item identifies an economic indicator;
   determining with a computer and retrieving from electronic storage related company data, wherein the related company data indicates companies significantly correlated to the selected economic indicator, and wherein the stock price of the related companies are known to change in response to changes in the selected economic indicator;
   displaying on the electronic computing device a first display field that identifies the selected focal item and a second display field that identifies the related companies; and
   receiving, via the user interface of the electronic computing device, a selection of a new focal item, wherein the new focal item identifies a company and the new focal item is displayed in the first display field.

2. The method of claim 1, wherein the electronic computing device is selected from the group consisting of a portable computer (PC), a laptop computer, a workstation, and a web-enabled telephone.

3. A computer-implemented system for providing an interactive user interface to a user, the system comprising:
   a server comprising at least one processor and an operatively associated memory, the memory comprising instructions for:
      serving a document containing the interactive user interface via a network to the user, the interactive user interface comprising, a first field identifying a focal item, wherein the focal item includes an identifier of an economic indicator; and a second field including company identifiers that identify companies related to the focal item, wherein the companies related to the focal item are companies whose stock price is known to change with changes to the focal item;
      receiving via the interactive user interface a selection of a new focal item, wherein the new focal item identifies a company and the new focal item is displayed in the first display field; and
   a database in communication with the server, wherein the database comprises data describing the companies related to the focal item.

4. A computer-implemented system for providing an interactive user interface to a user, the system comprising:
- a server comprising at least one processor and an associated memory, the memory comprising instructions that when executed by the at least one processor cause the at least one processor to serve a document containing the interactive user interface via a network to the user, the interactive user interface comprising:
  - a first field including a focal company identifier that identifies a focal company; and
  - a second field including supplier company identifiers that identify supplier companies that are suppliers to the focal company above a predetermined level, wherein a first supplier company identifier is associated with a supplier level indicator that indicates a level at which a first supplier company identified by the first supplier company identifier supplies the focal company, wherein at least a portion of the supplier company identifiers are spatially ordered within the second field according to the levels at which the corresponding supplier companies supply the focal company, wherein upon selection of a supplier company identifier, the supplier company identified by the supplier company identifier becomes a new focal company and the server identifies new supplier companies that are suppliers to the new focal company and repopulates the second field with new supplier company identifiers that identify the new supplier companies; and
- a database in communication with the server, wherein the database comprises data describing the focal company and the supplier companies.

5. The system of claim 4, wherein the level at which the first supplier company supplies the focal company is expressed as a portion of the first supplier company's revenue generated from the focal company.

6. The system of claim 5, wherein the portion of the first supplier company's revenue generated from the focal company is expressed as a percentage of the first supplier company's total revenue.

7. The system of claim 5, wherein at least a portion of the supplier company identifiers in the second field are associated with a hyperlink that, when activated by a user, causes the supplier company identified by the supplier company identifier corresponding to the activated hyperlink to become the new focal company.

8. A computerized method of presenting related company data in an interactive user interface, comprising:
- receiving, via the user interface of an electronic computing device, a user selection of a focal company;
- determining, by a computer, and retrieving from an electronic storage related company data, wherein the related company data indicates companies that are related to the focal company;
- displaying on the electronic computing device a first display field that identifies the focal company and a second display field that identifies supplier companies that are suppliers to the focal company above a predetermined level, wherein a first supplier company identifier is associated with a supplier level indicator that indicates a level at which a first supplier company identified by the first supplier company identifier supplies the focal company, and wherein at least a portion of the supplier company identifiers are spatially ordered within the second display field according to the levels at which the corresponding supplier companies supply the focal company;
- upon selection of a supplier company identifier, displaying the first display field identifying the selected supplier company as a new focal company;
- identifying, by the computer, new supplier companies that are suppliers to the new focal company; and
- repopulating the second display field with new supplier company identifiers that identify the new supplier companies.

9. The method of claim 8, wherein the electronic computing device is selected from the group consisting of a portable computer (PC), a laptop computer, a workstation, and a web-enabled telephone.

10. A computer-implemented system for providing an interactive user interface to a user, the system comprising:
- a server comprising at least one processor and an associated memory, the memory comprising instructions that when executed by the at least one processor cause the at least one processor to serve a document containing the interactive user interface via a network to the user, the interactive user interface comprising:
  - a first field including a focal company identifier that identifies a focal company; and
  - a second field including customer company identifiers that identify companies that are customers of the focal company above a predetermined level, wherein a first customer company identifier is associated with a customer level indicator that indicates a level at which a first customer company identified by the first customer company identifier is a customer of the focal company, wherein at least a portion of the customer company identifiers are spatially ordered within the second field according to the levels at which the corresponding customer companies are customers of the focal company, wherein upon selection of a customer company identifier, the customer company identified by the customer company identifier becomes a new focal company and the server identifies new customer companies that are customers to the new focal company and repopulates the second field with new customer company identifiers that identify the new customer companies.

11. The system of claim 10, wherein the level at which the first customer company is a customer of the focal company is expressed as a portion of the focal company's revenue generated from the first customer company.

12. The system of claim 11, wherein the portion of the focal company's revenue generated from the first customer company is expressed as a percentage of the focal company's total revenue.

13. The system of claim 10, wherein at least a portion of the customer company identifiers in the second field are associated with a hyperlink that, when activated by the user, causes the customer company identified by the customer company identifier corresponding to the activated hyperlink to become the new focal company.

14. A computerized method of presenting related company data in an interactive user interface, comprising:
- receiving, from the user interface of an electronic computing device, a user selection of a focal company;
- determining, by a computer, and retrieving from electronic storage related company data, wherein the related company data indicates companies that are related to the focal company;
- displaying on the electronic computing device a first display field that identifies the focal company and a second display field that identifies customer companies that are customers to the focal company above a predetermined level, wherein a first customer company identifier is associated with a customer level indicator that indicates a level at which a first customer company identified by the first customer company identifier is a customer of the focal company, wherein at least a portion of the customer company identifiers are spatially ordered within the second display field according to the levels at which the corresponding customer companies are customers of the focal company;

upon selection of a customer company identifier, displaying the first display field identifying the selected customer company as a new focal company;

identifying, by the computer, new customer companies that are customers to the new focal company; and repopulating the second display field with new customer company identifiers that identify the new customer companies.

15. The method of claim 14 wherein the electronic computing device is selected from the group consisting of a portable computer (PC), a laptop computer, a workstation, and a web-enabled telephone.

16. The method of claim 4, wherein the only company identifiers included in the second field are the supplier company identifiers.

17. The method of claim 10, wherein the only company identifiers included in the second field are the customer company identifiers.

* * * * *